G. W. MORRIS.
SPRING MOUNTING FOR VEHICLES.
APPLICATION FILED JAN. 20, 1910.
996,997.
Patented July 4, 1911.
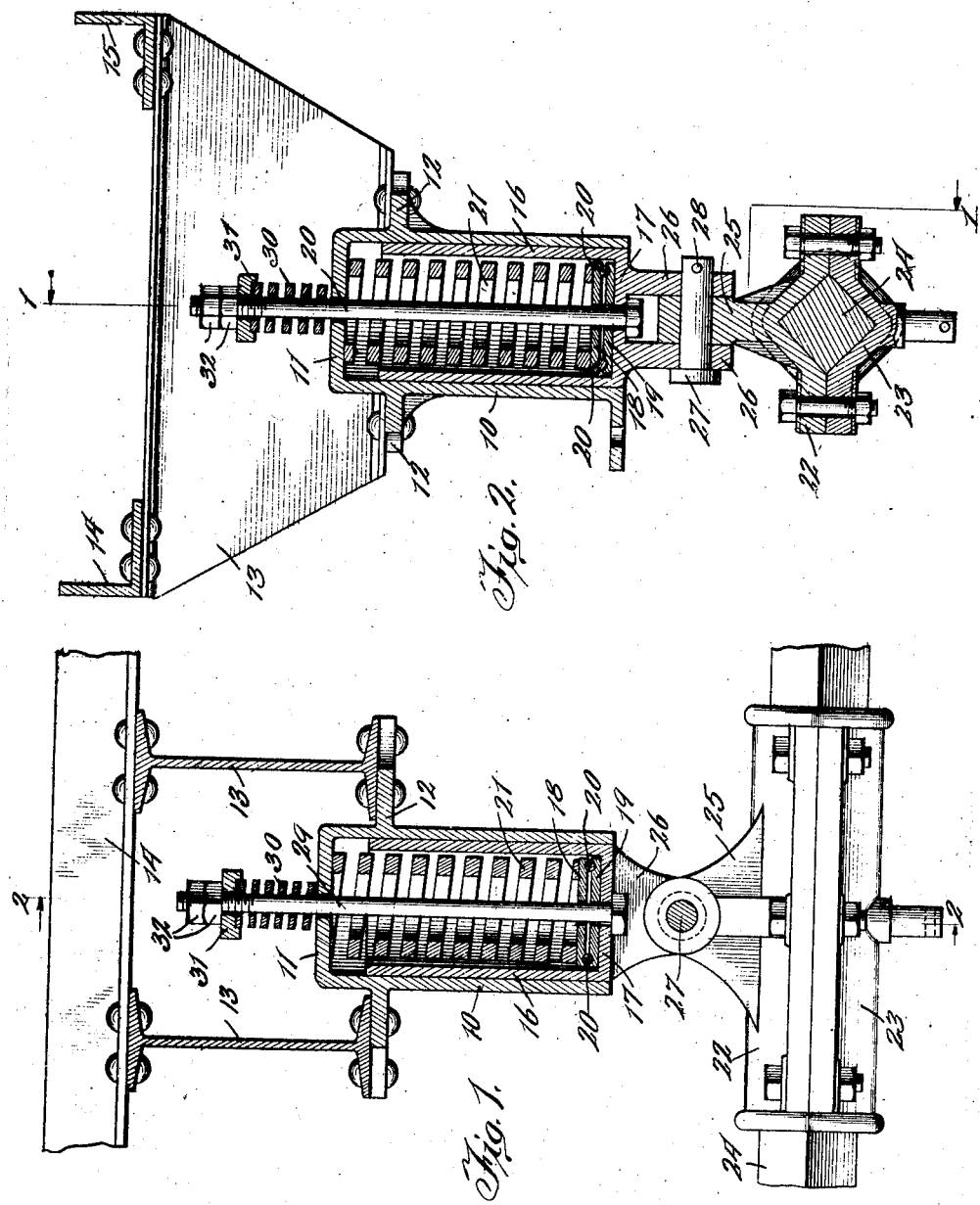

UNITED STATES PATENT OFFICE.

GEORGE W. MORRIS, OF RACINE, WISCONSIN.

SPRING-MOUNTING FOR VEHICLES.

996,997.  Specification of Letters Patent.  Patented July 4, 1911.

Application filed January 20, 1910. Serial No. 539,150.

*To all whom it may concern:*

Be it known that I, GEORGE W. MORRIS, a subject of the King of Great Britain, residing at Racine, in the county of Racine, State of Wisconsin, have invented certain new and useful Improvements in Spring-Mountings for Vehicles, of which the following is a specification, reference being had to the accompanying drawings.

This invention relates to spring mountings for vehicles and has for its object to provide a construction by the use of which the rebound of the springs upon which the body of a vehicle is supported from the axles may be controlled or prevented, said axles being mounted so as to swing horizontally relative to the body as is necessary in turning a corner. The idea of providing means for controlling the rebound of the supporting springs is disclosed and claimed in another application for patent on spring mountings for vehicles filed by me of even date herewith, Serial No. 539,149, and this feature is therefore not claimed by itself herein.

The means by which I have accomplished my object are shown in the drawings and hereinafter specifically described.

That which I believe to be new is set forth in the claims.

In the drawings:—Figure 1 is a vertical cross-section through the center of one of my improved mounting devices, being taken on line 1—1 of Fig. 2. Fig. 2 is a vertical cross-section on line 2—2 of Fig. 1.

Referring to the several figures of the drawings, in which corresponding parts are indicated by like reference characters:—10 indicates a cylinder closed at its upper end by a perforated plate 11, having formed with it, in the construction shown, an annular flange 12 to which, at opposite sides of the cylinder, there are secured by rivets or otherwise two short I-beams 13 of sufficient height to extend some little distance above the upper end of the cylinder.

14—15 indicate angle-irons riveted or otherwise suitably secured to the I-beams 13, said angle-irons forming part of the body of the vehicle.

16 indicates a second cylinder or plunger open at its upper end and closed at its lower end by a perforated plate 17, and having a working fit in the cylinder 10 so as to slide or rotate freely therein.

18—19 indicate two circular plates one above the other in the lower end of the cylinder 16, provided on their adjacent faces with registering annular grooves.

20 indicates balls interposed between the two plates 18—19.

21 indicates a coiled compression spring in the cylinders 10—16, bearing at its lower end against the plate 18 and at its upper end against the end-plate 11 of the cylinder 10.

22—23 indicate the members of a two-part axle-box held firmly together by bolts, as shown, or by any other suitable means, embracing an axle 24, upon which carrying wheels are adapted to be journaled.

25 indicates an ear projecting from the axle-box member 22 between two ears 26 depending from the plate 17, between which two ears the ear 25 is pivoted by a pin 27 passing through suitable openings in said ears. The pin 27 is provided with a suitable hole 28 through which a cotter-pin may be passed to hold the pin 27 in place.

29 indicates a bolt extending upward through the perforated end-plate 17, through suitable holes in the plates 18—19, and through the perforated end-plate 11 of the cylinder 10, the head of the bolt bearing against the under surface of the plate 17.

30 indicates a coiled compression spring mounted on the bolt 29 above the cylinder 10, the lower end of the spring bearing on the upper surface of the plate 11 and the upper end bearing against a cap 31 secured on the screw-threaded upper end of said bolt by nuts 32.

My improved device is especially designed for use in connection with the front axle of a vehicle, but I do not limit myself to that particular use of the device, except as hereinafter claimed, as the invention may be used in other ways wherever adaptable, whether or not the axle is to be swung on a vertical pivot for turning corners. Indeed, I do not wish to limit myself to the use of my device on a vehicle at all except as claimed, as it may be used for supporting a body on any suitable base, between which body and base a partial or complete rotation is desired, said body being at the same time movable at right angles to the direction of rotation and held yieldingly against such movement.

With a vehicle equipped with my improved device for connecting the front axle to the body of the vehicle, the spring 21 will of course serve to support the body, and the spring 30 may be held stressed more or less by adjusting the nuts 32 to limit the rebound of the spring 21 as desired; the axle being adapted to be swung on a vertical pivot in the ordinary manner without in any way disarranging the springs or straining any of the mechanism, the anti-friction devices employed serving to prevent any tendency of the spring 21 to uncoil as one cylinder is turned within the other.

What I claim as my invention and desire to secure by Letters Patent is,—

1. The combination with a vehicle body, a cylinder open at its lower end secured thereon, a hollow plunger open at its upper end adapted to slide and to rotate freely in said cylinder, a coiled spring inclosed within said cylinder and plunger and tending to prevent movement of said plunger into said cylinder, and anti-friction devices interposed between one end of said spring and its bearing whereby the rotation of said plunger relative to said cylinder may not cause said coiled spring to unwind, of a link connected with said plunger, a spring connected with said link and bearing on said cylinder and tending to prevent movement of said plunger out of said cylinder, and an axle connected with said plunger.

2. The combination with a vehicle body, a cylinder open at its lower end secured thereon, a hollow plunger open at its upper end adapted to slide and to rotate freely in said cylinder, a coiled compression spring inclosed within said cylinder and plunger and bearing at its upper end against the upper end of said cylinder, two superimposed plates having oppositely-disposed facing annular grooves, and balls in said grooves, said plates being located in said plunger with the lower end of said spring bearing against the upper one of said plates, said spring tending to prevent movement of said plunger into said cylinder, of a link connected with said plunger, a spring connected with said link and bearing on said cylinder and tending to prevent movement of said plunger out of said cylinder, and an axle connected with said plunger.

3. The combination with a vehicle body, a pair of short beams secured below said body a short distance apart, a cylinder open at its lower end, oppositely-extending flanges on said cylinder, means for securing said flanges to said beams, a hollow plunger open at its upper end adapted to slide and to rotate freely in said cylinder, and a spring inclosed within said cylinder and plunger and tending to prevent movement of said body and plunger toward each other, of a pin extending up through suitable openings in the ends of said cylinder and plunger, a compression spring mounted on said pin above said cylinder between said beams, means for holding said spring compressed on the upper portion of said pin, and an axle carried by said plunger at its lower end.

4. The combination with a vehicle body, a cylinder open at its lower end secured thereon, a hollow plunger open at its upper end adapted to slide and to rotate freely in said cylinder, and a spring inclosed within said cylinder and plunger and tending to prevent movement of said body and said plunger toward each other, of a link connected with said plunger, a spring connected with said link and bearing on said cylinder and tending to prevent movement of said plunger out of said cylinder, an axle-box pivotally connected with said plunger, and an axle carried by said axle-box.

GEORGE W. MORRIS.

Witnesses:
J. H. JONES,
EMERY JONES.